(12) United States Patent
Suh

(10) Patent No.: US 9,485,654 B2
(45) Date of Patent: Nov. 1, 2016

(54) METHOD AND APPARATUS FOR SUPPORTING SINGLE SIGN-ON IN A MOBILE COMMUNICATION SYSTEM

(71) Applicant: Samsung Electronics Co., Ltd., Suwon-si, Gyeonggi-do (KR)

(72) Inventor: Kyung Joo Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 14/353,626

(22) PCT Filed: Oct. 29, 2012

(86) PCT No.: PCT/KR2012/008949
§ 371 (c)(1),
(2) Date: Apr. 23, 2014

(87) PCT Pub. No.: WO2013/062393
PCT Pub. Date: May 2, 2013

(65) Prior Publication Data
US 2014/0308925 A1  Oct. 16, 2014

Related U.S. Application Data

(60) Provisional application No. 61/552,673, filed on Oct. 28, 2011.

(51) Int. Cl.
*H04M 1/66* (2006.01)
*H04W 12/06* (2009.01)
*H04L 29/06* (2006.01)
*G06F 21/41* (2013.01)

(52) U.S. Cl.
CPC .............. *H04W 12/06* (2013.01); *G06F 21/41* (2013.01); *H04L 63/0815* (2013.01)

(58) Field of Classification Search
USPC ........................................................ 455/411
See application file for complete search history.

(56) References Cited

U.S. PATENT DOCUMENTS

| 7,457,950 B1 | 11/2008 | Brickell et al. |
| 2005/0287990 A1* | 12/2005 | Mononen .............. G06F 21/335 455/411 |
| 2008/0313719 A1 | 12/2008 | Kaliski, Jr. et al. |

FOREIGN PATENT DOCUMENTS

| KR | 10-2008-0012946 A | 2/2008 |
| KR | 10-2010-0040413 A | 4/2010 |

* cited by examiner

*Primary Examiner* — Joel Ajayi
(74) *Attorney, Agent, or Firm* — Jefferson IP Law, LLP

(57) ABSTRACT

A terminal and a user authentication method of a terminal in a communication system are provided. The terminal and the method include transmitting information including a user identifier to a Relaying Party (RP), receiving a redirect request message including a OpenID authentication request from the RP, and verifying validity of the RP based on the redirect request message.

12 Claims, 2 Drawing Sheets

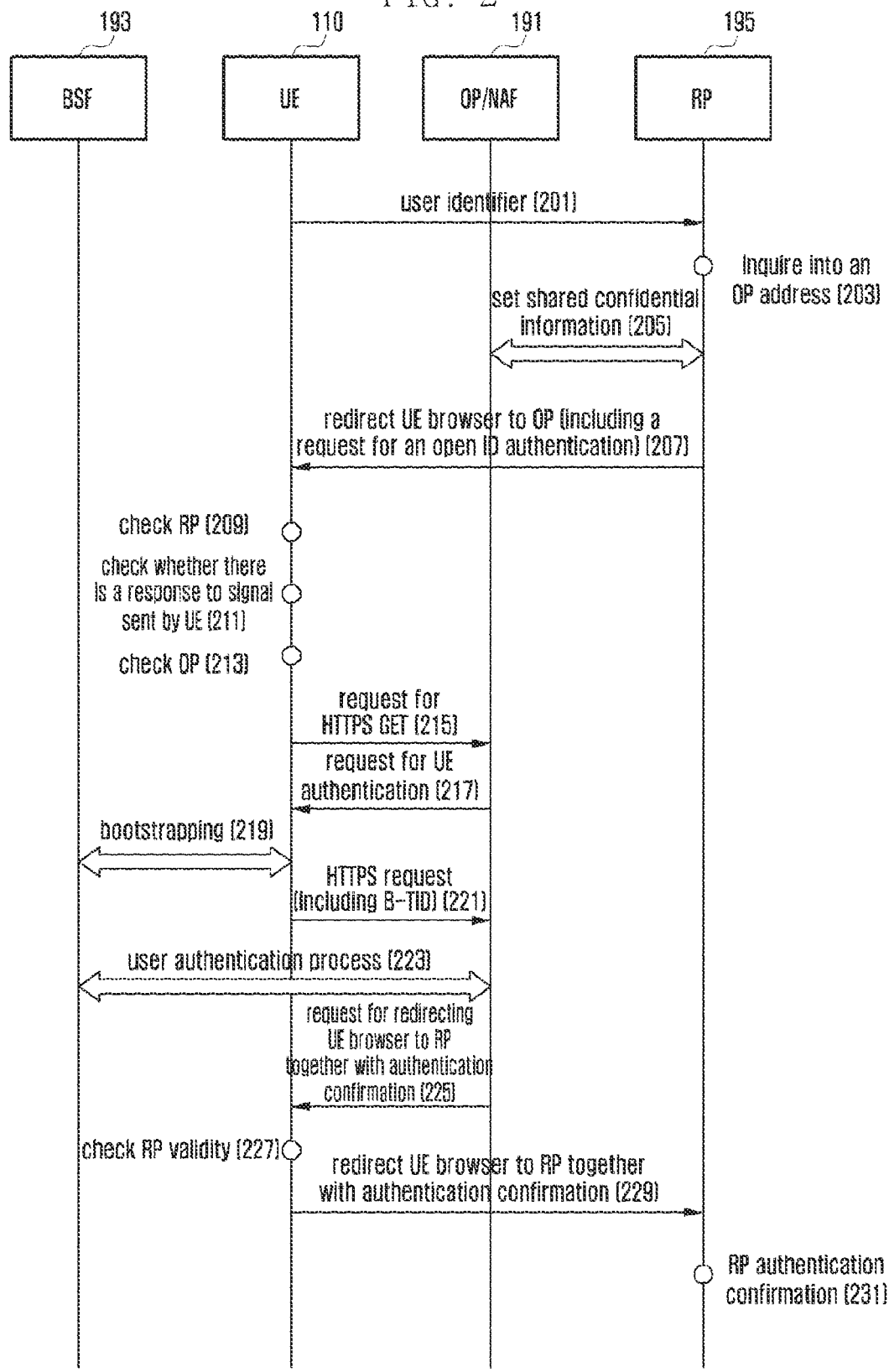

METHOD AND APPARATUS FOR SUPPORTING SINGLE SIGN-ON IN A MOBILE COMMUNICATION SYSTEM

TECHNICAL FIELD

The present invention relates to a mobile communication system and, in particular, to a method and system for supporting Single Sign-On procedure of a terminal efficiently in interoperation with the mobile communication system.

BACKGROUND ART

In the case that a User Equipment (UE) communicates with a Relaying Party (RP), there is a need of a method of transmitting an identifier and identifying the user based on the identifier.

However, the conventional system has security vulnerability in the procedure of transmitting an identifier and verifying the identifier for Single Sign-On. That is, the security vulnerability of the Single Sign-On may result in phishing attack and therefore there is a need of a method for supporting the Single Sign-On efficiently by improving the related procedure.

DISCLOSURE OF INVENTION

Technical Problem

The present invention aims to provide a method and apparatus for supporting the Single Sign-On procedure of the UE securely and efficiently in advanced mobile communication systems including 3GPP EPS (Evolved Packet System) supporting Generic Bootstrapping Architecture and related protocols, security protocols, and Open ID.

Solution to Problem

In accordance with an aspect of the present invention, a user authentication method of a terminal in a communication system includes transmitting information including a user identifier to a Relaying Party (RP), receiving a redirect request message including an OpenID authentication request from the RP, and verifying validity of the RP based on the redirect request message.

In accordance with another aspect of the present invention, a terminal for user authentication in a communication system includes a transceiver which transmits information including a user identifier to a Relaying Party (RP) and receives a redirect request message including a OpenID authentication request from the RP and a controller which verifies validity of the RP based on the redirect request message.

Advantageous Effects of Invention

The advantageous effects acquired by representative of the invention disclosed may be summarized as follows.

The present invention provides a method and system for supporting the Single Sign-On procedure of the UE securely and efficiently in an advanced mobile communication system such as 3GPP EPS supporting Generic Bootstrapping Architecture and related protocols, other security protocols, and Open ID.

The present invention is advantageous in that the UE performs the Single Sign-On (hereinafter, referred to as SSO) procedure more securely in a mobile communication system and thus the user can access all available resources through signal log-on to the network in the secure environment.

The present invention is advantageous in that the UE performs the Single Sign-On (hereinafter, referred to as SSO) more securely in an environment such as Evolved Universal Terrestrial Radio Access Network (EUTRAN) and Universal Terrestrial Radio Access Network (UTRAN)/GSM/EDGE Radio Access Network (GERAN) and thus the user can access all available resources of an enterprise through signal log-on to the network in the secure environment.

BRIEF DESCRIPTION OF DRAWINGS

FIG. 2 is a signal flow diagram illustrating a single user authentication procedure according to an embodiment of the present invention.

MODE FOR THE INVENTION

Figure 1:
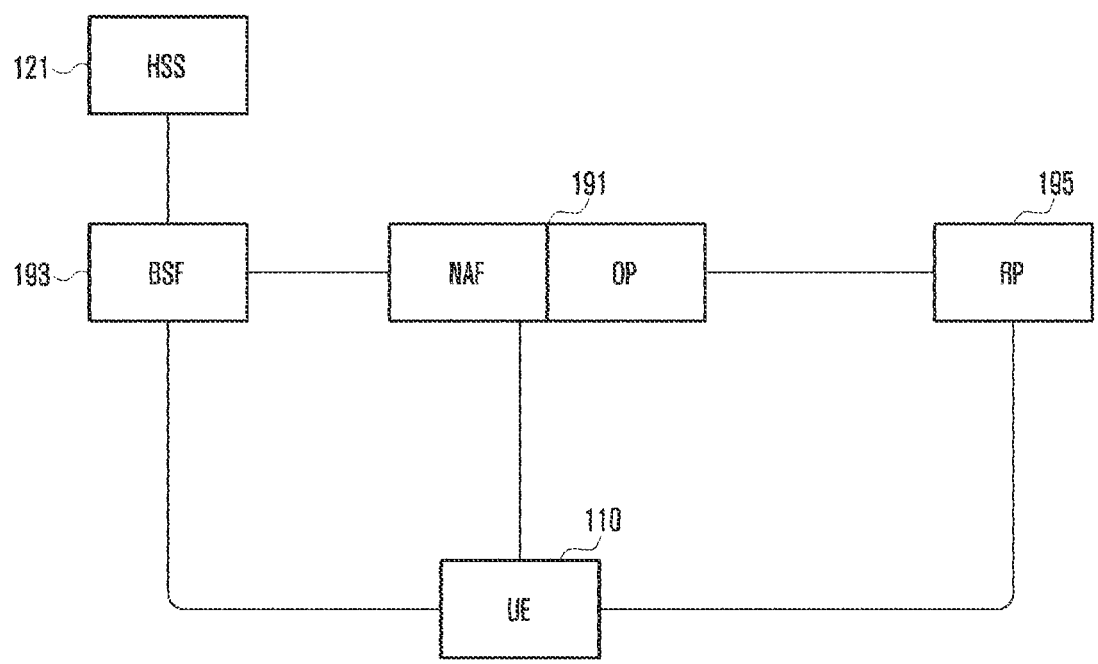
FIG. 1 is a block diagram illustrating an SSO environment in a mobile communication system according to an embodiment of the present invention.

The operation principle of the embodiments of the present invention is described in detail with reference to the accompanying drawings. Detailed description of well-known functions and structures incorporated herein may be omitted to avoid obscuring the subject matter of the present invention. Furthermore, terms used herein are defined by taking functions of the present invention into account and can be changed according to the practice or intention of users or operators. Therefore, definition of the terms should be made according to overall disclosures set forth herein.

The subject matter of the present invention aims to provide a more secure Single Sign-On procedure of the UE and management method in a mobile communication system environment. Although the description is directed to the 3GPP EPS, UTRAN, and GERAN, the present invention may also be applicable to other types of mobile communication systems. It is obvious that the procedure of processing the information for adapting the UE to the Single Sign-On environment may be modified variously without departing from the scope of the present invention.

The present invention relates to Single Sign-On (hereinafter, referred to as SSO) in a mobile communication network, and SSO is the capability with which the user logs on the network once and gains access to all available resources in an enterprise. The SSO program receives a user ID and password to log on all available servers. The present invention proposes a method and system capable of solving and managing security problems occurring in connecting to a mobile communication system through SSO by improving protocols and operations between network entities.

The method for managing the security between the UE and the network in a single user environment using the protocol messages and operations according to the present invention is implemented in a system including a User Equipment (UE), Universal Subscriber Identity Module (USIM), Home Subscriber Server (HSS) or Authentication Center (AuC), Bootstrapping Server Function (BSF) performing bootstrapping procedure, Open ID provider responsible of Open ID authentication server/Network Application Function (NAF), and Relaying Party (RP) for executing web application to determine whether the user controls the corresponding identifier; and the UE performs signal user authentication procedure by transmitting a user identifier, verifying RP and OP, and determining whether the connection is triggered by it, thereby solving the security problem occurring in the single user authentication procedure of the UE.

In the present invention, the UE sets the single user authentication information and parameters, authenticates security information, and transmits a request message for authentication in an environment such as Evolved Universal Terrestrial Radio Access Network (EUTRAN) or Universal Terrestrial Radio Access Network (UTRAN), GSM/EDGE Radio Access Network (GERAN), whereby the UE performing single user authentication advantageously in a secure environment.

Although the embodiment of the present invention is directed to the single user authentication method of a UE in the EUTRAN or 3GPP system environment as shown in FIG. 1, it is obvious to those skilled in the art that the present invention can be applied even to other communication systems having the similar technical background and channel format or similar network architecture or similar protocol or protocols different but operating in similar manner, with a slight modification, without departing from the spirit and scope of the present invention.

FIG. 1 is a block diagram illustrating an SSO environment in a mobile communication system according to an embodiment of the present invention.

Here, the 3GPP EPS architecture is depicted as an example. Although it is directed to the E-UTRAN, the present invention may be applied to other similar mobile communication systems.

Referring to FIG. 1, the User Equipment (UE) 110 may establish a radio connection with a base station for communication. The UE 110 may connect to a packet data network such as Internet through a Serving Gateway (Serving GW or SGW).

The UE 110 may include a Mobile Equipment (ME) and a Subscriber Identity Module (SIM). The ME may operate in association with the user and network for communication.

The SIM may operate to store and manage subscriber information of the user and security information.

The Home Subscriber Server (HSS) may manage the user and authentication information of the UE and service information. The HSS 121 may include Home Location Register (HLR) and Authentication Center (AUC).

The Bootstrapping Server Function (BSF) 193 may participate in the bootstrapping procedure for configuring a normal bootstrapping architecture.

The Network Application Function (NAF) 191 may execute an application. The NAF 191 may include an OpenID Provider (OP).

The Relaying Party (RP) 195 is the entity participating in the single user authentication procedure. The RP 195 includes a web application which requires evidence on whether the user uses an identifier.

The OP is the entity responsible for Open ID authentication server function.

An embodiment proposes a method of operating the single user authentication procedure among the network entities including UE 110, HSS 121, BSF 193, NAF/OP 191, and RP 195 based on the protocol used in the mobile communication and Internet communication.

Each of the UE 110, HSS 121, BSF 193, NAF/OP 191, and RP 195 includes a transceiver capable of transmitting and receiving data with another component and a controller capable of making a decision based on the data received by the transceiver and transmitting the decision result value by means of the transceiver.

FIG. 2 is a signal flow diagram illustrating a single user authentication procedure according to an embodiment of the present invention.

Referring to FIGS. 1 and 2, the UE 110 may send the RP 195 a signal including a user identifier by means of a browser at step 201. In transmitting the identifier, an IP Multimedia Public Identifier (IMPU) may be used. In the case of using IMPU, the IMPU may be transmitted along with the value acquired by encrypting the IMPU with a security key (Ks) of the UE.

In another embodiment, IP Multimedia Private Identity (IMPI) or the IMPI derived from Internal Mobile Station Identity (IMSI) may be used as the user identifier.

In another embodiment, the UE 110 may send the RP 195 another type of identifier such as URL or Extensible Resource Identifier in the transmission process. In the transmission process, the UE 110 also may send the RP 195 the value for use in authenticating the corresponding UE or a value encrypted with a security key.

At step 203, the RP 195 may inquire the address of the OP based on the signal received at step 201. The OP may include the NAF.

At step 205, the RP 195 may configure shared secret information with the OP/NAF 191 enquired at step 203.

At step 207, the RP 195 may send the UE 110 a signal including the information requesting for redirecting the browser of the UE 110 with the shared secret information configured at step 205. This signal may include an OpenID authentication request.

At step 209, the UE 110 may determine whether the RP 195 which has inquired the address of the OP at step 203 is a valued RP based on the signal received at step 207. This operation is of verifying the validity of the RP. Depending on the embodiment, the UE 110 may verify the name and address of the RP 195 and further the Uniform Resource Locator (URL) corresponding to the RP 195. The address of the RP 195 may include an IP address. That is, whether the RP 195 is available for communication may be determined based on at least one of the name of protocol necessary for accessing the resource, domain name for identifying a specific computer on the Internet, and hierarchical path of the location of a computer file. Depending on the embodiment, the UE 110 may store a whitelist of available RPs such that the UE 110 determines whether the RP 195 is valid based on the whitelist.

At step 211, the UE 110 may check whether a signal corresponding to the identifier transmitted at step 201 based on the signal received at step 207. If the IMPU or a value obtained by encrypting the IMPU with a security key has been transmitted by the UE 110 at step 201, the UE 110 may decrypt the IMPU with the security key and verify that the identifier has been transmitted by it based on the decrypted value.

Depending on the embodiment, it may be required for the UE to perform the bootstrapping process as step 219 in order to perform step 211. In the case that the value for use in verifying the UE 110 is included in the signal in a plain state, it is possible to perform identity verification on the identifier with or without being encrypted based on the corresponding value.

At step 213, the UE 110 may verify whether the OP inquired by the RP 195 at step 203 is a valid OP based on the signal received at step 207. This procedure is the procedure of verifying the validity of the OP. That is, it is to verify whether the corresponding request is transmitted to the OP configured as the destination of the authentication message. Depending on the embodiment, whether the validity of the OP may be preset by the UE 110 and changed according to network operation configuration.

At step 215, if it is determined that the entities are valid through steps 209 to 213, the UE 110 may send the OP a HTTPS GET message based on the signal received at step 207.

At step 217, the NAF may initiate UE authentication procedure (authentication request) based on the HTTPS GET message received at step 215.

The UE 110 performs the bootstrapping procedure with the BSF 193 at step 219 and sends the OP/NAF 191 a HTTPS request message including Bootstrapping Transaction Identifier (B-TID) for use in the bootstrapping transaction at step 221.

The OP/NAF 191 and the BSF 193 may perform user authentication at step 223 based on the message transmitted at step 221.

Meanwhile, the OP/NAF 191 may send the RP 195 a signal requesting for redirection of the browser of the UE 110 along with authentication confirmation at step 225. At this time, the OP/NAF 191 may transmit a message authentication code or time stamp encrypted with a key shared with the RP 195 or a digital signature.

At step 227, the UE 110 may check whether the RP 195 is available for communication based on the signal received at step 225. In order to achieve this, if the message is encrypted for redirection from the OP/NAF 191 to the RP 195 at steps 225 and 229, the message transmitted from UE as the intermediate node to the OP/NAF 191 for verifying the RP 195 as the valid receiver of the message may include the address or name of the RP 195.

At step 227, the UE 110 may check whether the RP 195 is valid based on the received information and redirect the message to the RP 195. This message may include authentication confirmation.

Afterward, the UE 110 may redirect the browser of the UE to the RP 195 along with the authentication confirmation at step 229.

At step 231, the RP 195 may verify the validity of the UE 110 which has transmitted the authentication confirmation based on the received authentication confirmation. Depending on the embodiment, the RP 195 may verify the validity of the UE 110 by checking the validity of the message received at step 229 or comparing the codes or time stamp values for authentication. After the single user authentication procedure has been completed as above, data communication is performed through the authenticated entities.

Although the description has been made with reference to particular embodiments, the present invention can be implemented with various modifications without departing from the scope of the present invention. Thus, the present invention is not limited to the particular embodiments disclosed but will include the following claims and their equivalents.

The invention claimed is:

1. A user authentication method of a terminal in a communication system, the method comprising:
transmitting information including a user identifier to a Relaying Party (RP), the user identifier being an IP Multimedia Public Identifier (IMPU), the IMPU being transmitted along with a value acquired by encrypting the IMPU with a security key of the terminal;
receiving a redirect request message including an OpenID authentication request from the RP;
identifying whether the OpenID authentication request corresponds to the user identity information transmitted by the terminal based on the redirect request message; and
verifying validity of the RP based on the redirect request message,
wherein the redirect request message is for redirecting a browser of the terminal to an OpenID Provider (OP).

2. The method of claim 1, wherein the verifying of the validity of the RP comprises verifying the validity of the RP based on at least one of URL, name, and address of the RP.

3. The method of claim 1, wherein the receiving of the redirect request message comprises receiving the message including information on OpenID Provider (OP) for redirection, the method comprising further verifying validity of the OP for redirection.

4. The method of claim 1, further comprising:
transmitting an authentication request to the OP based on the redirect request message; and
receiving authentication accept information and information requesting for redirection to the RP.

5. The method of claim 4, further comprising requesting the RP for authentication based on the authentication accept information.

6. The method of claim 4, wherein the transmitting of the authentication request comprises:
transmitting an HTTP GET request to the OP;
receiving an authentication request from the OP in response to the HTTP GET request; and
transmitting a bootstrapping transaction ID acquired through the bootstrapping to the OP.

7. A terminal for user authentication in a communication system, the terminal comprising:
a transceiver configured to:
transmit information including a user identifier to a Relaying Party (RP), the user identifier being an IP Multimedia Public Identifier (IMPU), the IMPU being transmitted along with a value acquired by encrypting the IMPU with a security key of the terminal, and
receive a redirect request message including an OpenID authentication request from the RP; and
a controller configured to:
identify whether the OpenID authentication request corresponds to the user identity information transmitted by the terminal based on the redirect request message, and
verify validity of the RP based on the redirect request message,
wherein the redirect request message is for redirecting a browser of the terminal to an OpenID Provider (OP).

8. The terminal of claim 7, wherein the controller is further configured to verify the validity of the RP based on at least one of URL, name, and address of the RP.

9. The terminal of claim 7,
wherein the transceiver is further configured to receive the message including information on OpenID Provider (OP) for redirection, and
wherein the controller is further configured to verify validity of the OP for redirection.

10. The terminal of claim 7, wherein the transceiver is further configured to transmit:
transmit an authentication request to the OP based on the redirect request message, and
receive authentication accept information and information requesting for redirection to the RP.

11. The terminal of claim 10, wherein the transceiver is further configured to transmit to the RP a request for authentication based on the authentication accept information.

12. The terminal of claim 7, wherein the transceiver is further configured to:
- transmit an HTTP GET request to the OP, receives an authentication request from the OP in response to the HTTP GET request, and
- transmit a bootstrapping transaction ID acquired through the bootstrapping to the OP.

\* \* \* \* \*